(No Model.)
J. GOHM.
POTATO DIGGER.
No. 437,593. Patented Sept. 30, 1890.
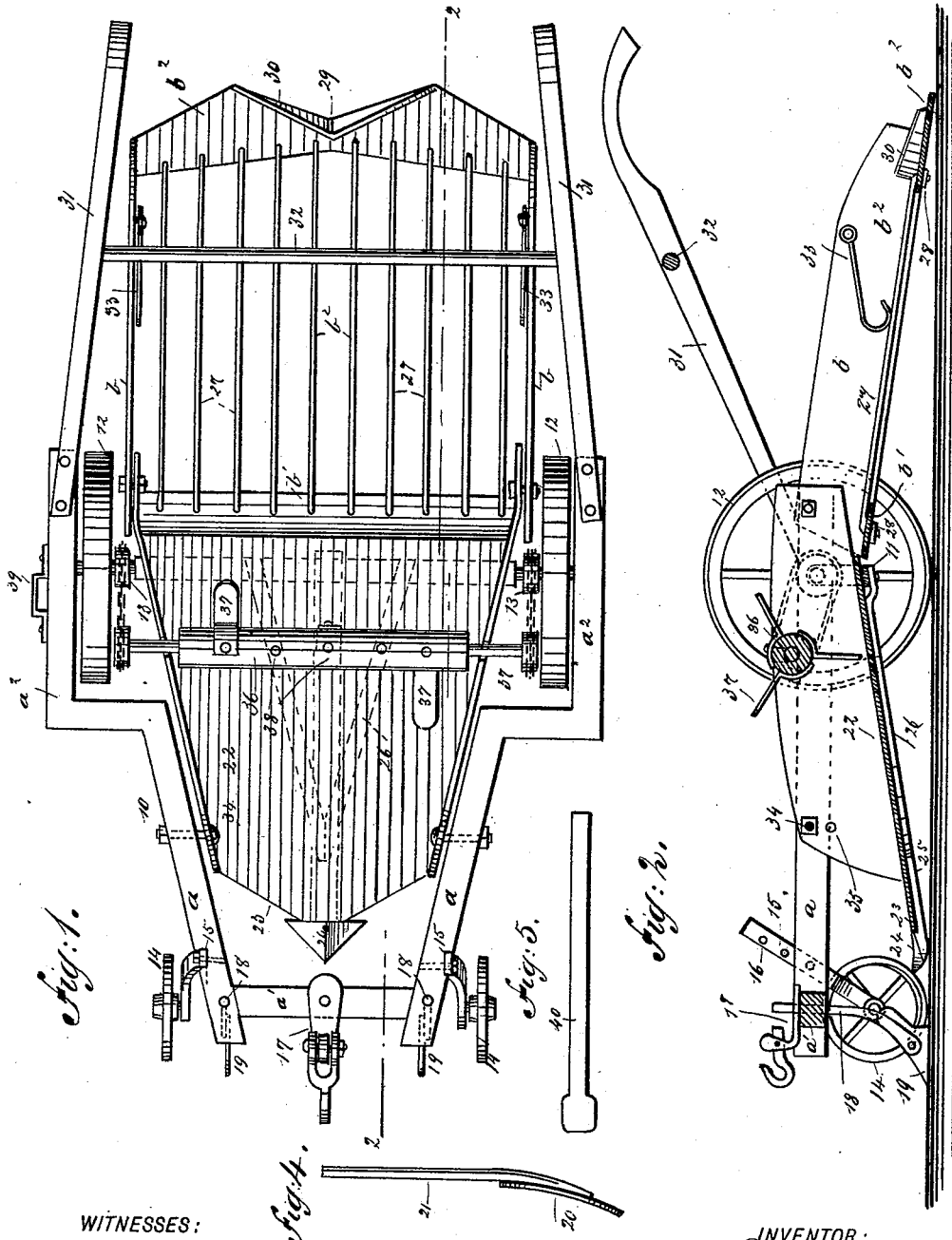
WITNESSES:
INVENTOR:
BY
ATTORNEYS

UNITED STATES PATENT OFFICE.

JAMES GOHM, OF NEWPORT, RHODE ISLAND.

POTATO-DIGGER.

SPECIFICATION forming part of Letters Patent No. 437,593, dated September 30, 1890.

Application filed April 1, 1890. Serial No. 346,139. (No model.)

*To all whom it may concern:*

Be it known that I, JAMES GOHM, of Newport, in the county of Newport and State of Rhode Island, have invented a new and Improved Potato-Digger, of which the following is a full, clear, and exact description.

My invention relates to an improvement in potato-diggers, and has for its object to provide an implement of simple and durable construction, capable of unearthing the potatoes without damaging them and of delivering the said potatoes over a screen to the ground at the rear of the machine.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the implement. Fig. 2 is a longitudinal section on line 2 2 of Fig. 1. Fig. 3 is a front elevation of a cultivator-blade adapted for use in connection with the implement; and Fig. 4 is a side view of the same. Fig. 5 is a plan view of a paddle adapted for cleaning the implement.

The frame 10 consists of two side bars $a$, inclined toward each other at the front and connected by a cross-bar $a'$, each side bar at its rear extremity being preferably provided with an essentially L-shaped extension $a^2$, whereby the rear portion of the frame is of much greater width than the forward portion. In the rear wider portion of the frame a yoke-axle 11 is journaled, the body of the said axle being bowed downward, and within the frame upon said axle, near each end, a drive-wheel 12 is loosely mounted, which wheels are preferably made quite large and heavy, and to the inner face of each wheel 12 a sprocket-wheel 13 is attached. At the forward portion of the frame small wheels 14 are located, one of said wheels being placed outside of each side bar $a$ of the frame, and the said wheels are each journaled upon the lower end of an upright axle-bar 15, the lower end of each axle-bar being provided with a spindle attached at a right angle thereto, upon which spindles the front wheels 14 revolve.

The upper end of the axle-bar is provided with a series of apertures 16, and the axle-bars are fitted in recesses produced in the frame, as best shown in Fig. 1, in such manner that they have an upward and rearward inclination, as illustrated in Fig. 2. The axle-bars are usually secured to the frame by means of suitable bolts, and as the said bars are apertured they may be adjusted upon a frame to support the latter at any desired point from the ground.

Upon the front cross-bar $a'$ of the frame a clevis or draft-bar 17 is attached, and near the forward end of each side bar of the frame a stock 18 is attached capable of vertical adjustment, and to the lower ends of said stocks plows 19 of any approved construction are secured. The plows and stocks may be set at any depth or angle of the rows, so as to throw to one side all surplus soil and weeds without disturbing the potatoes.

When the soil is much crusted, instead of the plows and the stocks the cultivator-blades 20, having attached shanks 21, and illustrated in Figs. 3 and 4, are preferably substituted for the plows and the stocks.

Upon the bow portion of the axle 11 the rear end of a scoop 22 is secured. The scoop 22 is preferably made of greater width at its rear than at its forward end, and the said forward end is essentially triangular, as illustrated at 23 in Fig. 1. At the central portion of the front contracted end of the scoop a cutter or point 24 is secured, which cutter or point is preferably triangular in general contour. This cutter or point is attached by means of bolts or otherwise to the forward end of a brace-bar 25, secured longitudinally and centrally to the under face of the scoop and likewise to the axle 11. The point 24 of the scoop may be removed at any time for purposes of sharpening or for replacement when worn out, and in order to strengthen the bottom of the scoop diagonal brace-bars 26 (shown in dotted lines in Fig. 1) are attached to the central brace-bar, one at each side and also to the axle. To the rear end of the scoop, preferably to the upturned sides thereof, the forward ends of the vertical side pieces $b$ of a screen or sieve 27 are pivoted, the said screen or sieve being preferably made to consist of the vertical side pieces $b$, referred to, a front connecting-bar $b'$, and a rear connecting-bar $b^2$. The front connecting-bar, as shown in Fig. 2, is preferably made to extend a slight distance under the wide rear end of the scoop. The bottom of the screen or sieve consists of a series of spaced rods $b^3$, having their ends carried downward through suitable apertures in the front and rear connecting-bars $b'$ and $b^2$, and upon the downwardly-extending ends of each rod a nut 28 is usually screwed, bearing against the under side of the sieve or screen frame. The rear connecting-bar $b^2$ of the sieve has an essentially V-shaped cut or recess 29 in the central portion of its outer or rear edge and an upright flange 30 attached to or forming a portion of the walls of said recess, whereby an outlet is provided for the sieve or screen at each side and the material delivered upon the rods or bars of the screen or sieve are guided from the center to the outlets.

To the rear ends of the side bars of the frame the handles 31 of the implement are attached, which handles are connected by a horizontal brace-rod 32, and upon the side pieces $b$ of the screen or sieve hooks 33 are pivoted, adapted for engagement with the brace rod or bar 32 of the handles, whereby the rear end of the screen or sieve (which when the implement is in operation rests upon the ground) may be elevated when not in operation.

In order to steady the forward or reduced end of the scoop and to retain it in a downwardly-inclined position, so that it will contact with the ground, bolts 34 are passed through the scoop and through the side pieces $a$ of the frame. The attachment of the scoop to the axle may be such that the scoop at its forward end may be slightly elevated to clear the ground, in which event a series of apertures 35 is produced in the side pieces of the scoop, through either of which a bar 34 may be passed. Near the rear end of the scoop, in the side pieces thereof, the trunnions of a drum 36 are journaled, which trunnions are each provided with an attached sprocket-wheel 37, the said sprocket-wheels being connected by a suitable belt with the sprocket-wheels 13 upon the axle.

Upon the drum 36, at intervals in the length of the same, fingers 37 are attached in such manner as to radiate therefrom, and the said fingers are preferably so placed that they will each project from a different portion of the drum, whereby no two of the fingers are in alignment. These fingers have their inner ends curved to the contour of the periphery of the drum, and are attached to the drum at their curved ends by a suitable bolt or bolts. The drum is provided with a number of apertures 38, in order that the fingers may be shifted when found desirable.

Upon one side of the frame a bracket-strap 39 is secured, adapted to receive a paddle 40, which paddle is used when occasion may demand to clean the scoop and likewise the screen.

In operation, as the implement is drawn forward the soil is upturned by the plows or the cultivators, whichever may be employed, and the scoop, entering the ground at the rear of the plows or cultivators, receives the potatoes which are unearthed as the implement advances, and the fingers of the revolving drum deliver the potatoes to the sieve or screen. As the potatoes pass down the screen the earth drops through the bars and the potatoes finally pass through the outlets $b^2$ of the screen to the ground at each side of the implement.

It is evident that by bearing down upon the handles 21 the front of the implement may be conveniently elevated, thus greatly facilitating the turning of corners.

Having thus described my invention, I claim as new and desire to secure by Letters Patent—

1. A potato-digger consisting in a frame having handles 31, rear wheels 12 12, and smaller forward wheels 14, the downward and forward inclined scoop having a central point 24, the plows on the frame in front of the scoop, and the screen pivoted to the rear end of the scoop and having a suspension-hook 33, substantially as set forth.

2. In a potato-digger, a screen having a Λ-shape flange 30 at its delivery or outlet end, forming an outlet at each side of its center, substantially as set forth.

3. In an implement of the character described, the combination, with a frame narrower at its front than at its rear end, vertically-adjustable supporting-wheels located at the front end of the frame, an axle secured near the rear end of the frame, drive-wheels loosely mounted upon said axles, larger than the forward wheels, and plows adjustably secured in the forward portion of the frame, of a scoop supported from the axle within the frame, having a forward and downward inclination and an attached cutting-point, a screen pivoted to the rear end of the scoop, a drum journaled upon the side pieces of the scoop, fingers radiating from said drum, and a connection, substantially as described, between the drum and the drive-wheels.

4. In an implement of the character described, the combination, with a frame narrower at its front than at its rear end, vertically-adjustable supporting-wheels located at the front end of the frame, a cranked axle secured near the rear end of the frame, drive-wheels loosely mounted upon the said axles, larger than the forward wheels, and plows adjustably secured in the forward portion of the frame, of a scoop supported upon the axle, narrower at its front than at its rear end and provided at its forward end with a central attached point, a screen or sieve pivoted to the rear end of the scoop, having an outlet at its rear end at each side of the center, a drum journaled upon the side pieces of the scoop near the screen or sieve, a belt-connection between the trunnions of the drum and the drive-wheels, and means, substantially as described, for elevating the rear end of the screen, as and for the purpose specified.

JAMES GOHM.

Witnesses:
 HERBERT L. DYER,
 JAMES B. FINCH.